(12) United States Patent
Poth et al.

(10) Patent No.: US 6,501,572 B1
(45) Date of Patent: Dec. 31, 2002

(54) RECOGNITION DEVICE FOR CONNECTING CONTACTS ON SWITCH PANELS

(75) Inventors: Rainer Poth, Bad Vilbel (DE); Brunhilde Wenge, Eichenbarleben (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/319,612

(22) PCT Filed: Dec. 12, 1997

(86) PCT No.: PCT/DE97/02936
§ 371 (c)(1),
(2), (4) Date: Aug. 19, 1999

(87) PCT Pub. No.: WO98/26483
PCT Pub. Date: Jun. 18, 1998

(30) Foreign Application Priority Data

Dec. 13, 1996 (DE) .......................................... 196 53 683

(51) Int. Cl.[7] ................................................. H02B 5/00
(52) U.S. Cl. ........................................ 359/109; 361/605
(58) Field of Search .......................... 359/109; 361/605, 361/611, 612, 618, 621; 250/491.1, 526; 362/253, 458

(56) References Cited

U.S. PATENT DOCUMENTS

| | | | |
|---|---|---|---|
| 3,966,297 A | 6/1976 | Vigreux et al. .............. 359/405 |
| 4,234,006 A | 11/1980 | Cookson ................... 137/15.14 |
| 4,687,890 A | * 8/1987 | Yamamoto et al. ........... 218/75 |
| 4,709,291 A | * 11/1987 | Eggert et al. .................. 361/2 |
| 4,821,141 A | * 4/1989 | Torimi et al. ................ 361/612 |
| 4,837,662 A | * 6/1989 | Takeuchi et al. ............. 361/618 |
| 6,195,253 B1 | * 2/2001 | Fahlgren et al. ............. 361/603 |

FOREIGN PATENT DOCUMENTS

| | | |
|---|---|---|
| DE | 34 33 362 | 3/1986 |
| DE | 296 08 127 | 8/1996 |
| EP | 0 122 595 | 10/1984 |
| JP | 04 049802 | 2/1992 |

* cited by examiner

*Primary Examiner*—Thomas Mullen
(74) *Attorney, Agent, or Firm*—Kenyon & Kenyon

(57) ABSTRACT

Singe-pole or multipole, metal-encapsulated, compartmentalized or gas-insulated switchpanels of a switching station, which are connected by three-position switches, having isolating and grounding functions, to power switches designed with or without vacuum switching tubes, the switchpanels each being arranged in busbar housings or separate isolating housings, and being equipped with transmission devices for the visual observation of fixed contacts are provided. The transmission device includes a camera module which can be connected via a connecting device to a display device outside of the switchpanel. A lighting device is arranged in a displaced manner relative to a camera module for glare-free imaging of the busbar fixed contacts.

8 Claims, 1 Drawing Sheet

RECOGNITION DEVICE FOR CONNECTING CONTACTS ON SWITCH PANELS

FIELD OF THE INVENTION

The present invention relates to single-pole or multipole, metal-encapsulated, compartmentalized or gas-insulated switchpanels of a switching station, which are connected by three-position switches, having isolating and grounding functions, to power switches designed with or without vacuum switching tubes, the switchpanels each being arranged in busbar housings or separate isolating housings, and being equipped with transmission devices for the visual observation of fixed contacts.

BACKGROUND INFORMATION

Conventional transmission devices for switchpanels are described in the German Patent No. 296 08 127 in the form of endoscope devices. In that case, the endoscope devices are directly guided through guide tubes to the inspection windows of the switchpanels, to be able to view the contact points arranged behind these inspection windows. The guide tubes of the switchpanels are advantageously accessible from the front side, so that the operating personnel can directly manipulate the endoscope devices from the operating side of the switchpanels.

The endoscope devices are equipped with an optical lens at their free end and also have a light source, allowing the contact areas arranged in the housings of the switchpanels to be observed using these endoscope devices. At the same time, however, the endoscope devices must be positioned in such a way that both the image segment and the image brightness are adequate to be able to assess the contact points with sufficient reliability.

Furthermore, the German Patent No. 34 33 362 describes a monitoring device having sensors arranged at inspection windows for the visual detection of contact points, the sensors responding to luminous effects of an accidental arc inside the gas compartment and controlling, by suitable switching measures, the triggering of a protective device. However, it is not possible to image contacts using this monitoring device.

European Patent No. 0 122 595 describes a gas-insulated switching station, inside of which optical fiber cables are provided for inspecting the contacts. The glass fibers themselves are arranged frontally relative to the contacts and are illuminated by lighting windows situated opposite them. However, it is not possible to assess individual contact points by this means.

Furthermore, Patent Abstract of Japan for Publication No. 04 049 802 describes a shared camera module outside of a switching station for reading several operating devices lying in one plane.

SUMMARY

An object of the present invention is to provide a monitoring device for visually observing the fixed contacts in the housings of the switchpanels, whose manipulation is substantially simplified, and whose constructional outlay is considerably reduced, especially within the switchpanels. According to the present invention, this is achieved by the following features:

1.1 the transmission device includes a camera module which can be connected via a connecting device to a display device;

1.2 the camera module is positioned on the outside of the housing of the switchpanels in such a way that the fixed contacts to be observed are visible as a compact image segment;

1.3 the transmission device is provided with a switchable lighting device which is also arranged on the outside of the housing; and 1.4 the lighting device and the camera module are arranged one beneath the other and displaced relative to each other in such a way that the image segment discernibly reproduces the fixed contact in all circuit states.

By using a camera module which is positioned at a permanent location of the respective switchpanel for acquiring the most favorable image segment, manipulations due to habit are no longer necessary when observing the fixed contacts. Furthermore, the fixed installation of the camera modules ensures a homogeneous image segment which, given appropriately favorable positioning of the camera modules, permits optimum imaging of the fixed contacts without additional adjustments.

In this connection, a switchable lighting device is provided, independently of the camera module. The lighting device, independent of the camera module, assuming that it is appropriately positioned, always allows the fixed contacts to be imaged free from glare and reflection. Moreover, the switchable lighting device makes additional energy-saving effects possible which, particularly if power is supplied by portable storage batteries, prove to be advantageous. In this case, power supply to the lighting device in conjunction with the display device, using a connecting device which can be manipulated from outside is to be regarded as particularly favorable.

According to one advantageous embodiment of the present invention, the following features are provided:

2.1 the light concentration of the lighting device (BE) is provided by a halogen lamp having an integrated lens for concentrating light; and 2.2 the optical axis of the lens is aligned relative to the optical axis of the camera module in such a way that the two axes intersect approximately in the center area of the fixed contacts.

These measures ensure that the fixed contacts are sufficiently lighted for reliable assessment, even when energy-saving lighting equipment is used.

Another advantageous embodiment of the present invention provides the following features:

3.1 the camera module and the lighting device are separately assigned to each phase of the switching station; and 3.2 the display device, which can be connected via the connecting device, is jointly assigned to several phases of the switching station.

Optionally, a single, non-stationary display device may be connected to each individual camera module of the switching station. In this connection, the present invention also contemplates the inspection of a plurality of fixed contacts of a switchpanel simultaneously if further display devices are provided. In any case, the display devices can be assigned to the fixed contacts of a switching station that are to be observed in parallel, in such a way that they are adapted to the corresponding configuration. Thus, for example, given a fixed assignment of the display devices to the respective camera modules, the corresponding connecting devices can be omitted and replaced by a fixed connection.

DETAILED DESCRIPTION

Figure 1:
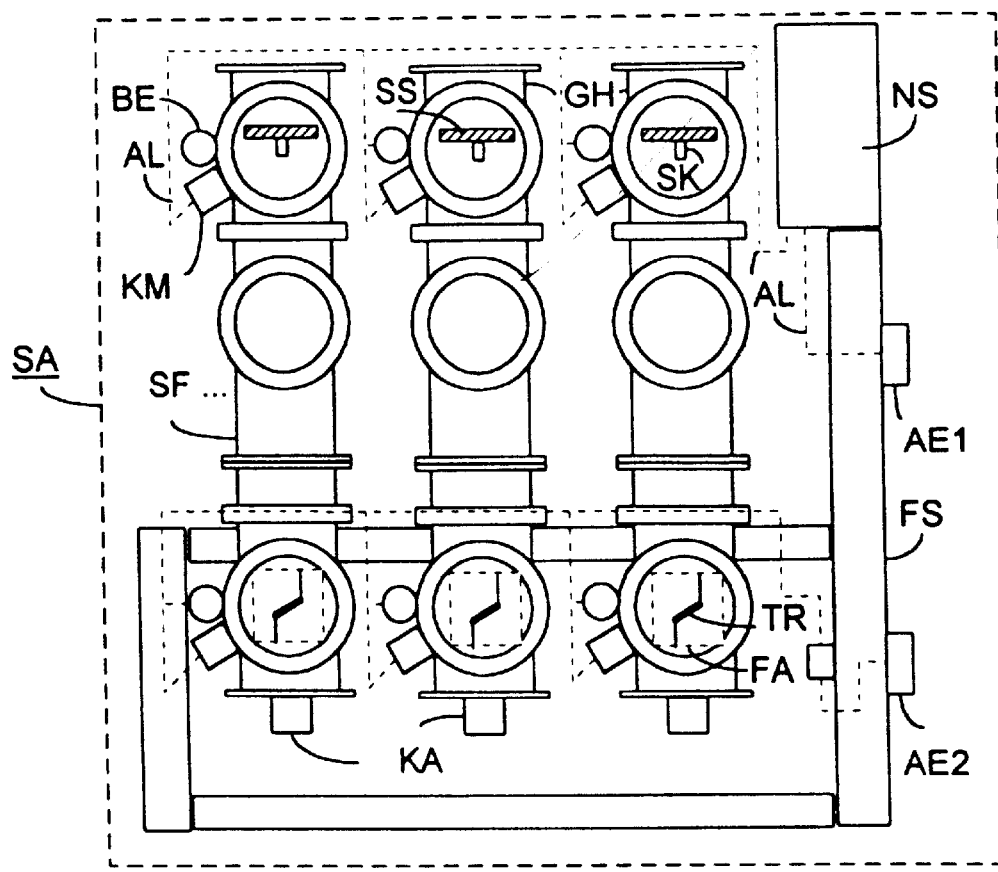
FIG. 1 shows a schematic representation of a multipole, gas-insulated switchpanel according to the present invention in which transmission devices are disposed within the installation.

FIG. 1 shows a switching station SA containing multipole, metal-encapsulated, gas-insulated switchpanels SF. In the upper region of switchpanel SF, it is indicated that within housing GH is a busbar fixed contact SK which can be observed from outside with the aid of camera module KM and associated lighting device BE. In addition, the broken line indicates that camera module KM and lighting device BE are connected to low-voltage cabinet NS through connecting lead AL, the ends thereof ending at the corresponding connecting devices AE1, AE2. Located below busbars SS are field terminals FA with the respective disconnectors TR, which can also be made discernible from outside by camera module KM in conjunction with lighting device BE, in the same way as busbar connection contact SK. Here as well, a connecting lead leads to connecting device AE2 which, just as connecting device AE1, can be accessed by the operating personnel at front side FS of switching station SA.

Figure 2:
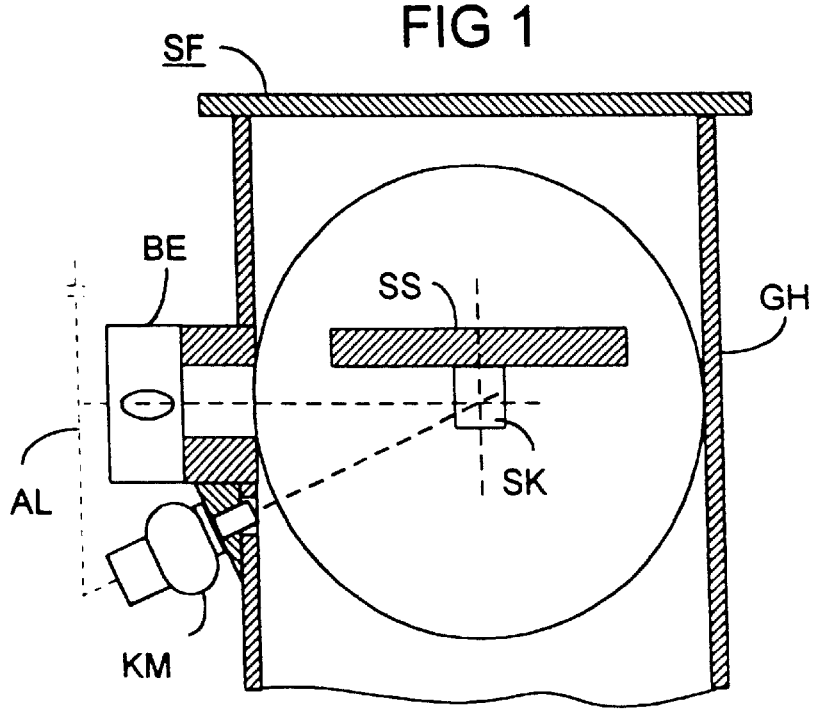
FIG. 2 shows an advantageous arrangement of a lighting device relative to a camera module according to the present invention.

FIG. 2 shows further details of the positioning of lighting device BE relative to camera module KM. Located inside gas-insulated switchpanel SF, which is enclosed in a gas-tight manner by housing GH, is busbar SS together with its busbar fixed contact SK. Lighting device BE is positioned at switchpanel SF of housing GH in such a way that the light is focused directly on the center area of busbar fixed contact SK. It can further be seen that camera module KM is arranged below lighting device BE at switchpanel SF, and is also directed with its optical axis toward the center area of busbar fixed contact SK. This position of lighting device BE relative to camera module KM makes it possible to easily show the image segment of busbar fixed contact SK, which aids the operating personnel in assessing the state of the contact. This constant arrangement of camera module KM with lighting device BE at housing GH of switchpanel SF reproduces a constant image segment, without requiring camera modules KM to be specially adjusted and positioned relative to lighting devices BE.

The alignment and coordination of lighting device BE and camera module KM for imaging disconnector TR of field terminal FA (FIG. 1) is advantageously carried out in the same way as for busbar fixed contact SK.

What is claimed is:

1. A switchpanel for use in a switching station, a display device being associated with the switching station, the switchpanel comprising:

a housing, at least one fixed contact being positioned within the housing;

a connecting device for coupling a camera module to the display device; and a transmission device, the transmission device including the camera module and a switchable lighting device, the camera module being positioned outside of the housing in such a way that the at least one fixed contact is visible via the camera module as a compact image segment, the lighting device being arranged outside of the housing, one of the lighting device and the camera module being arranged beneath another of the lighting device and the camera module, the light device and the camera module being displaced relative to each other in such a way that the image segment discernably reproduces the at least one fixed contact in all circuit states.

2. The switchpanel according to claim 1, wherein the switchpanel is one of a single-pole and multi-pole switchpanel.

3. The switchpanel according to claim 1, wherein the switchpanel is connected via a three-position switch to a power switch, the three-position switch performing at least one of isolating and grounding functions.

4. The switchpanel according to claim 3, wherein the power switch includes a vacuum switching tube.

5. The switchpanel according to claim 1, wherein the housing is a busbar housing, a busbar being positioned within the busbar housing.

6. The switchpanel according to claim 1, wherein the switchpanel is metal-encapsulated.

7. The switchpanel according to claim 1, wherein the lighting device includes a halogen lamp with an integrated lens for concentrating light emitted by the halogen lamp, and wherein an optical axis of the lens and an optical axis of the camera module are relatively aligned such that the optical axis of the lens and the optical axis of the camera module approximately intersect at a center area of the fixed contact.

8. The switchpanel according to claim 1, wherein the camera module and the lighting device are separately allocated to each phase of the switching station, and wherein the display device is jointly allocated to several phases of the switching station.

* * * * *